Sept. 24, 1946.  C. A. CADWELL  2,408,291

WELDING MATERIAL AND PROCESS

Filed Feb. 3, 1944

INVENTOR.
CHARLES A. CADWELL
BY
Oberlin, Limbach & Day.
ATTORNEYS

Patented Sept. 24, 1946

2,408,291

UNITED STATES PATENT OFFICE 2,408,291

WELDING MATERIAL AND PROCESS

Charles A. Cadwell, Cleveland, Ohio, assignor to The Electric Railway Improvement Company, Cleveland, Ohio, a corporation of Ohio Application February 3, 1944, Serial No. 520,896

14 Claims. (Cl. 75—27)

1

The present improvements, relating as indicated to welding, have more particular regard to a method of welding in which the molten metal employed in the operation is produced by the exothermic reaction between a metallic oxide and a strong reducing agent such as aluminum. Actually the improved method and composition utilized in the production of such molten metal is not limited to the particular use to which the latter may be put, e. g. welding, but such method and material may be employed for other purposes, as for the production of castings or the like.

In my U. S. Patent No. 2,229,045, dated January 21, 1941, I have pointed out the difficulties inherent in the production of molten metallic copper by an exothermic reaction between copper oxide and aluminum and disclose a method and composition of materials whereby such reaction, generally known as the Thermit process, may be utilized, despite the great speed with which the reaction takes place and the excessive heat evolved. Briefly stated, such previously disclosed improvement resides in the use instead of aluminum by itself of sufficient copper as metal (preferably in the form of an alloy) with the aluminum to absorb a substantial amount of the heat generated by the reaction. At the same time there is obtained an increased amount of copper made up of that produced by reduction of the oxide plus the copper present as such in the mixture.

Molten copper produced by use of the material and in the manner set forth in my previous patent has been found highly satisfactory for use in welding copper bonds to steel rails. However, particularly where a charge or "shot" of molten copper is required in small amount only, as for example in welding small size, e. g. signal, bonds to rails by exothermic reaction, it is still difficult accurately to control the speed of such exothermic reaction and avoid a spattering of molten metal. It has also been found that due to the rapid chilling where a cold mold is employed there is a tendency for the weld metal to solidify in other than desired solid form and to assume a so-called "puffy" condition. While the reason for this last-mentioned behavior has not been firmly proven, it has heretofore been found desirable to heat the mold in order to avoid it.

I have now discovered that one of the factors which contributes to the above-mentioned undesirable condition of the metal produced by the exothermic reaction is the nature of its flow characteristic. The metal resulting from reduction of copper oxide by aluminum is not a good flow

2 metal and its impact against the surface of a rail, as in the operation of welding a bond thereto, results in lack of adhesion. Merely raising the temperature of the metal does not overcome this difficulty, while causing the stream of molten metal to impinge against the rail tends to dissolve steel from the latter, mix it with the exothermic metal and further reduce the flow characteristics as well as the strength of the latter. Still another difficulty in obtaining metal having a good flow characteristic is that in order to reduce all of the copper oxide it is necessary in practice to include an excess of aluminum in the charge so that there may be a small amount of the latter left in the exothermic metal leading to what is known in the metallurgy of copper as over-reduction.

One object accordingly of the present invention is to produce exothermic metal, and particularly copper, which will have a good flow characteristic, i. e. overcome the molecular resistance between copper and iron at high temperatures. A further object is to avoid the production of over-reduced metal, i. e. so-called "puffy" metal in the case of copper.

To the accomplishment of the foregoing and related ends, said invention, then, consists of the means hereinafter fully described and particularly pointed out in the claims.

The annexed drawing and the following description set forth in detail one approved combination of ingredients embodying my invention, such disclosed means constituting, however, but one of various forms in which the principle of the invention may be used.

Figure 1:
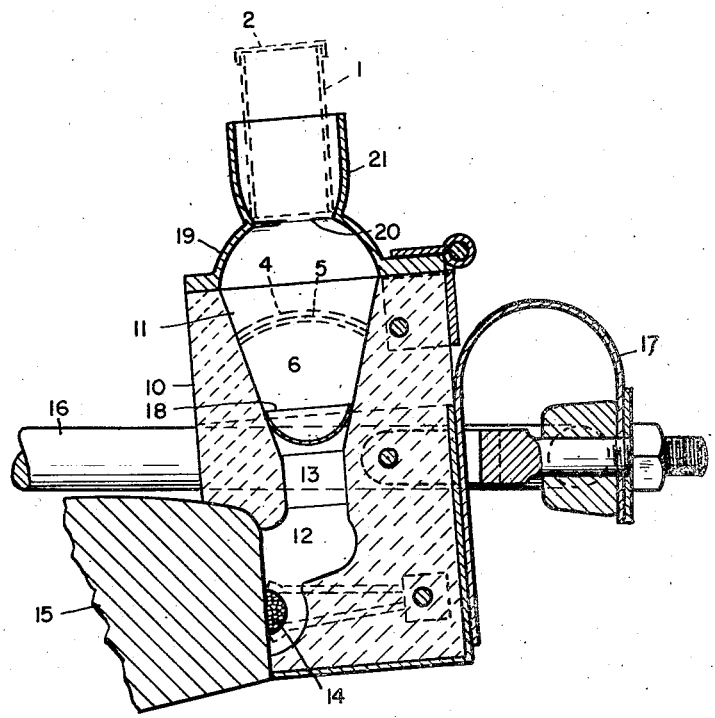
Fig. 1 is a sectional view of a rail bonding apparatus showing the manner in which my improved exothermic reaction charge may be employed in attaching the terminal of a rail bond to a rail.
Figure 2:
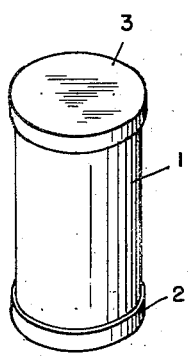
Fig. 2 is a perspective view of a cartridge wherein the charge is placed for convenient use in connection with such apparatus.
Figure 3:
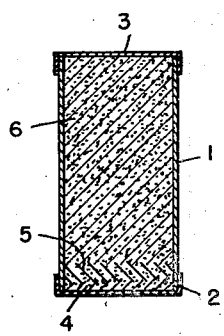
Fig. 3 is a cross-sectional view of such cartridge indicating the disposition of its contents.

The composition which I prefer to employ for the main body of the charge comprises finely divided copper and aluminum, the latter having such copper alloyed therewith to absorb a substantial amount of the heat generated by the reaction. Additional copper as metal may also be provided by utilizing for the copper oxide so-called mill scale, the individual grains of which will be found red at the center from partially oxidized copper, while the surface may be black, highly oxidized and very conducive to quick ignition and combustion.

In compounding the foregoing ingredients I carefully avoid the use of an excess of aluminum as reducing agent for the copper scale, and preferably keep the amount thereof somewhat less than that theoretically required for the reaction. As a reducing agent for the balance of the copper oxide I then add manganese either as a metal or in the form of a boron compound, or preferably approximately equal amounts of both, such addition in any event being relatively small compared with the amount of the previously named ingredients of the charge. The manganese boron compound may be in the form either of the mono- or diboride and the use of manganese metal in addition thereto is desirable as it reduces the amount of the manganese boride, which is relatively costly. Since the latter furthermore is used in the form of a very fine powder which would tend to be misplaced or segregated in the charge, I preferably add also a corresponding small percentage of tin oxide which, because of its unctuous, slightly viscous nature, serves to hold the fine manganese boride powder uniformly disseminated throughout the body of the charge.

The following is an illustrative formula for compounding a charge as described above for the production of highly heated molten copper by exothermic reaction, the indicated parts being approximate and by weight, viz.:

| | |
|---|---|
| Copper scale | 31 |
| Copper-aluminum alloy (60% Cu, 40% Al) | 9½ |
| Manganese metal | 1 |
| Manganese boride | 1 |
| Tin oxide | 1 |

In addition to manganese and/or manganese boride, or in place of either of these ingredients, I may employ silicon with satisfactory results. As a matter of fact, silicon carbide will preferably be used as a convenient source of silicon; furthermore, it apparently yields better results than does the use of elemental silicon. The following is an illustrative formula for compounding an exothermic charge in which silicon is thus employed, the indicated parts as before being approximate and by weight, viz.:

| | |
|---|---|
| Copper scale | 21 |
| Copper-aluminum alloy (60% Cu, 40% Al) | 6 |
| Manganese metal | 0.7 |
| Manganese boride | 0.5 |
| Silicon carbide | 0.2 |
| Tin oxide | 0.2 |

Other ingredients which may similarly be added are zirconium or zirconium alloy, which is a commercial product sold to the steel industry and contains from 35 to 50% zirconium, the remainder being silicon iron in varying proportions. The following is a typical formula on the order of those previously given but with such zirconium alloy included:

| | |
|---|---|
| Copper scale | 21 |
| Aluminum saw-dust | 1.7 |
| Zirconium alloy | 1 |
| Manganese metal | 0.5 |
| Manganese boride | 0.5 |
| Tin oxide | 0.2 |

In the last described composition it will be noted that instead of using copper-aluminum alloy, i. e. aluminum with copper added as ballast, I utilize aluminum by itself, preferably in the form of grains such as are produced by a fine toothed hack-saw working on an ingot of pure aluminum. In such case it will be understood that in order to produce the same amount of copper the amount of scale used would have to be greater than that used in the previously described compositions in order to make up for the lack of copper ballast there provided by the copper alloyed with the aluminum.

Several reducing agents of different metals all in the same charge will burn out in the order of the heats of formation of the oxides of the different metals involved; thus aluminum will burn out first and thereafter the others in the order given in the following table:

| Metal | Kg. cals |
|---|---|
| Al | 380 |
| Fe | 265 |
| Si | 198 |
| Zr | 178 |
| Mn | 125 |

Accordingly, the amount of each of these metals introduced in the charge will be chosen to secure the desired temperature in the resulting exothermic metal, care being taken that the quantity of each is such that any metal not desired in the exothermic metal is completely burned out and that only such metals, e. g. manganese and silicon, which produce desired flow characteristics, will be left.

In any case involving the use of the different metals in the foregoing table of heat formation, it is desirable that the aluminum, as well as the iron if used, be entirely burned out in the reaction. In other words, the total amount of such strong reducing element should be at least slightly less than required to reduce all of the copper oxide. The difference will be made up by using such weaker agents as described above. Iron in excess is particularly objectionable since it does not enter into solution with copper except to a very small percent. Likewise, for reasons previously set forth, the use of an excess of aluminum produces objectionable results in the exothermic metal.

For use in welding a rail bond to a rail, as illustrated in Fig. 1 of the drawing, a measured charge of the mixture of ingredients is conveniently made up in the form of a package or cartridge by being placed in a suitable container 1 having a closed bottom 2 and a removable top 3. In assembling the charge there is first placed in the bottom of such container a small layer 4 of igniting powder which may be of any well known composition, a satisfactory one being provided by adding a small proportion of red phosphorus to a mixture of finely divided copper oxide and aluminum or copper-aluminum alloy. The main body 5 of reaction material is then placed directly upon such layer of ignition powder.

The rail bonding apparatus illustrated in Fig. 1 comprises a combined mold and crucible block 10 in which the crucible 11, which may better be termed a reaction chamber, is connected with the mold cavity 12 by means of a screw 13. Such mold cavity is open on one side and formed to hold the terminal 14 of the rail bond against the head 15 of a rail or other part to which such terminal is to be welded. During the welding operation the mold is resiliently held against such rail head by a clamp arm 16 and interposed spring member 17.

A cup-shaped plug 18 composed of metal which will be melted by the heat of the reaction in the crucible chamber, or by contact of the exothermic metal therewith, is inserted at the bottom of such chamber so as to retain the charge therein until the reaction is complete.

For the purpose of properly placing the charge in the crucible, a hinged cover 19, which normally serves to close the upper end thereof, is provided with a central opening 20, aligned with the axis of the crucible chamber, an upwardly and outwardly flaring rim 21 surrounding such opening. The latter is of smaller diameter than the container 1, in which the charge is packaged as above described, so that when such container, following the removal of cap 3, is placed in an inverted position within rim 21, as shown in dotted outline in Fig. 1, its contents will be discharged into the crucible chamber and assume the form of a slightly mounted body, of which the lower main portion is composed of the main body of the charge on top of which will be superimposed a thin layer 5 consisting of the ignition powder. If now such layer of ignition powder be ignited, as by a spark, the main body of the charge will be heated to the point of reaction, the resultant molten metal will collect in the bottom of the crucible chamber, and as the plug 18 yields, will be discharged through the sprue into the mold.

From the foregoing table showing heat of oxide formation of the metals of the several compounds involved it will be seen that the exothermic metal thus produced from a charge having any one of the compositions previously described, will be of somewhat lower temperature than if such charge consisted only of the copper scale and aluminum or copper-aluminum alloy in substantially the indicated proportions. Thus the heat of formation of aluminum oxide is over three times the formation of manganese dioxide, and to the extent that the former is replaced by the latter, the exothermic metal from a charge of given composition will be lower in temperature.

Aside from thus reducing the temperature of the exothermic metal by the addition of manganese metal and boride as secondary reducing agents, the presence of a slight excess of manganese which is carried over into the exothermic metal does not lead to the objectionable results that occur where over-reduction is due to an excess of aluminum in the charge. On the contrary, the excess of manganese thus entering the exothermic metal serves measurably to improve the flow characteristic of the latter. This characteristic being thus provided, the use of zinc or other element with low boiling point becomes unnecessary. Accordingly, notwithstanding the difference in heat produced by the reaction, my improved exothermic reaction mixture yields a metal which has not only a better flow characteristic and which may be applied without gouging the rail and yet stick or adhere more strongly thereto.

In conclusion I should state that I have found that at least in certain cases it is advantageous to use instead of aluminum as the main reducing agent, a mixture of aluminum and iron, preferably in the form of an aluminum-iron alloy (50–50) as illustrated by the following formula, the indicated parts being approximate and by weight, viz.:

Copper scale_____ 19
Al-Fe alloy (50–50) _____ 5

In the foregoing example the copper is assumed to consist of 12.92 parts by weight of copper oxide (CuO) and 6.08 parts of unoxidized copper. In a composition such as the foregoing, just as those previously described, it is desirable to include a small amount (approximately 2%) each of silicon in the form of silicon carbide (carborundum) and manganese boride, these additional ingredients being, as before, thoroughly intermixed with the copper scale and Al-Fe alloy. In the formula given above the corresponding parts by weight of such silicon carbide and manganese boride will be 0.5, although this will vary, particularly in the case of the boride, depending upon whether the latter is in the form of the mono- or di-compound.

It should be noted that the use of an aluminum iron alloy as described above or of iron broadly as a reducing agent is covered by my co-pending application filed August 8, 1942, Serial No. 454,189, now Patent No. 2,387,715, dated October 30, 1945. Also the term "zirconium" as used herein is to be understood as comprehending the commercial product known as "zirconium alloy," which as previously explained includes iron and silicon in addition to zirconium.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:

1. A new composition of matter for use in a copper-producing exothermic reaction comprising a mixture of copper oxide, aluminum, together with copper as metal, and a relatively small amount of manganese partly as metal and partly as the boron compound thereof.

2. A new composition of matter for use in a copper-producing exothermic reaction comprising a mixture of copper oxide, aluminum, the latter having sufficient copper alloyed therewith to absorb a substantial amount of the heat generated by the reaction, and a relatively small amount of manganese partly as metal and partly as the boron compound thereof, together with a further small amount of tin oxide.

3. A new composition of matter for use in a metal-producing exothermic reaction comprising the following ingredients in approximately the parts by weight indicated:

Copper scale_____ 31
Copper-aluminum alloy (60% Cu, 40% Al) __ 9½
Manganese _____ 1 the amount of aluminum in said alloy being slightly less than required to reduce the copper oxide in said scale.

4. A new composition of matter for use in a metal-producing exothermic reaction comprising the following ingredients in approximately the parts by weight indicated:

Copper scale_____ 31
Copper-aluminum alloy (60% Cu, 40% Al) __ 9½
Manganese boride_____ 1

5. A new composition of matter for use in a metal-producing exothermic reaction comprising the following ingredients in approximately the parts by weight indicated:

Copper scale_____ 31
Copper-aluminum alloy (60% Cu, 40% Al) __ 9½
Manganese _____ 1
Manganese boride_____ 1

6. A new composition of matter for use in a metal-producing exothermic reaction comprising the following ingredients in approximately the parts by weight indicated:

| | |
|---|---|
| Copper scale | 31 |
| Copper-aluminum alloy (60% Cu, 40% Al) | 9½ |
| Manganese | 1 |
| Manganese boride | 1 |
| Tin oxide | 1 |

7. A new composition of matter for use in a metal-producing exothermic reaction comprising the following ingredients in approximately the parts by weight indicated:

| | |
|---|---|
| Copper scale | 21 |
| Copper-aluminum alloy (60% Cu, 40% Al) | 6 |
| Manganese metal | 0.7 |
| Manganese boride | 0.5 |
| Silicon carbide | 0.2 |
| Tin oxide | 0.2 |

8. A new composition of matter for use in a metal-producing exothermic reaction comprising the following ingredients in approximately the parts by weight indicated:

| | |
|---|---|
| Copper scale | 21 |
| Aluminum saw-dust | 1.7 |
| Zirconium | 1 |
| Manganese metal | 0.5 |
| Manganese boride | 0.5 |
| Tin oxide | 0.2 |

9. A new composition of matter for use in a metal producing reaction, comprising a mixture of copper oxide, aluminum in an amount slightly less than required to reduce all such oxide, and a sufficient amount of an agent taken from the group consisting of manganese, manganese boride, silicon, silicon carbide and zirconium to complete such reduction.

10. A new composition of matter for use in a copper-producing exothermic reaction comprising a mixture of copper oxide, aluminum in an amount slightly less than required to reduce all such oxide, and a sufficient amount of manganese to complete such reduction.

11. A new composition of matter for use in a copper-producing exothermic reaction comprising a mixture of copper oxide, aluminum in an amount slightly less than required to reduce all such oxide, and a sufficient amount of manganese to complete such reduction and provide a slight excess thereof in the resulting product.

12. A new composition of matter for use in a copper-producing exothermic reaction comprising a mixture of copper oxide, aluminum in an amount slightly less than required to reduce all such oxide, and a sufficient amount of manganese, partly as metal and partly as the boron compound thereof, to complete such reaction.

13. In a method of producing highly heated molten metal for use in welding, the steps which comprise inducing an exothermic reaction between copper oxide and aluminum, the amount of such aluminum being insufficient to reduce all such oxide, and including an agent taken from the group consisting of manganese, manganese boride, silicon, silicon carbide and zirconium to complete such reduction.

14. In a method of producing highly heated molten metal for use in welding, the steps which comprise inducing an exothermic reaction between copper oxide and aluminum, the amount of such aluminum being insufficient to reduce all such oxide, and including an agent taken from the group consisting of manganese, manganese boride, silicon, silicon carbide and zirconium, the amount of such agent being slightly in excess of that required to complete such reduction.

CHARLES A. CADWELL.